(No Model.)

J. MYERS.
HORSESHOE.

No. 350,441. Patented Oct. 5, 1886.

Attest:
F. A. Hopkins
Edward Stew.

Inventor:
John Myers
By Knight Bro.
Attys

UNITED STATES PATENT OFFICE.

JOHN MYERS, OF ST. LOUIS, MISSOURI.

HORSESHOE.

SPECIFICATION forming part of Letters Patent No. 350,441, dated October 5, 1886.

Application filed December 21, 1885. Serial No. 186,346. (No model.)

*To all whom it may concern:*

Be it known that I, JOHN MYERS, of the city of St. Louis, in the State of Missouri, have invented a certain new and useful Improvement in Horseshoes, of which the following is a full, clear, and exact description, reference being had to the accompanying drawings, forming part of this specification, and in which—

Figure 1:
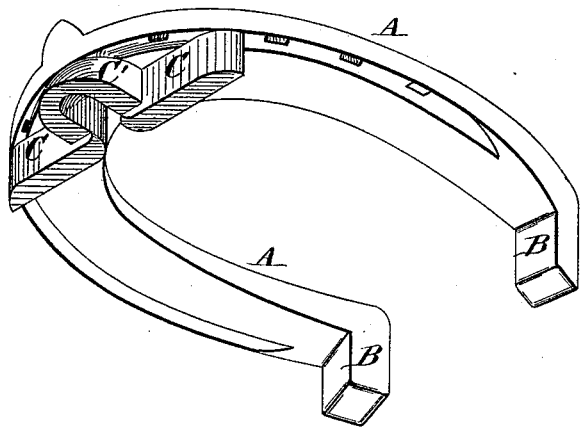
Figure 2:
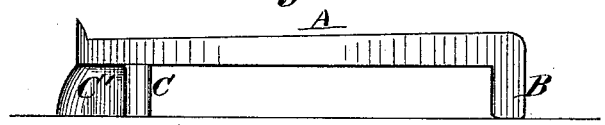
Figure 3:
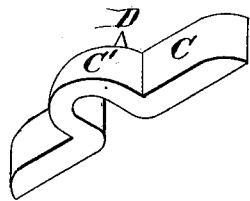
Figure 4:
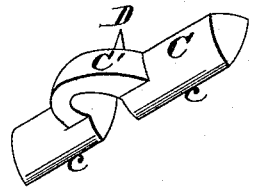
Figure 5:
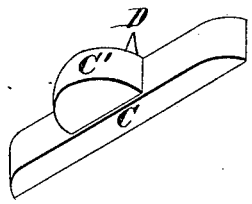

Figure 1 is an under perspective view of a horseshoe having my improvement. Fig. 2 is a side view of the same. Figs. 3, 4, and 5 are perspective views of toe calks having slight differences in construction, but each having the essential feature of my improvement.

The purpose of the improvement is the avoidance of the danger that arises to man and horse from the toe-calk entering the channel in which runs the grip-arm of a cable railway-car. This has been the cause of many and serious accidents. The toe-calk, when of the ordinary construction, is liable to enter this grip-slot or channel when a horse is crossing the same and as the horse lifts the heel of the hoof first the toe-calk turns in the channel and becomes tightly clamped therein, so that the horse is unable to extricate it. The consequence is that the horse is thrown and very serious accident results, both to the horse and his driver or rider. Hoofs have been torn from the leg and legs fractured from this cause.

I am aware that it has been proposed to place the toe-calk proper near the rear edge of the bar of which the shoe is formed, (instead of near the front edge, as is usual,) and to place near said front edge (in the place usually occupied by the calk proper) a supplemental calk of less height than the said calk proper, a space being left between the two. This is, however, not the equivalent of my invention, which consists in certain features of novelty hereinafter fully described, and more particularly pointed out in the claims.

A represents a shoe, which in the main has any ordinary or preferred construction.

B B are the heel-calks.

The toe-calk has a usual bar or part, C, transverse to the shoe, and a forward extension or fulcrum, C', which may be in U form or form of a horseshoe, as seen in Figs. 3 and 4, or may be made solid, as seen in Fig. 5. This lateral enlargement or extension C', in order to be of the desired service, should be equal or nearly equal in height to the calk proper—that is to say, their surfaces should be flush, or nearly so, in order to prevent the said calks entering the grip-slot. It is also desirable that the said enlargement should be much less in width than the length of the calk, in order that the weight of the shoe may not be materially increased, if at all. The part C is usually made narrow to give the horse a better hold on the ground and prevent slipping, and this, of course, renders it liable to enter the grip-channel, as before explained. Now, it will be seen that when the horse has a toe-calk of the improved construction that immediately the heel of the hoof begins to rise the weight of the hoof comes on the projection C' and all the rest of the shoe moves upward from the ground. It will also be seen that the projection C' will prevent the toe-calk from entering the grip-channel to any dangerous depth, as it will come in contact with the iron rail forming the side of the channel.

In Figs. 1, 4, and 5 the under side of the projection C' is somewhat elevated above the bottom of the part C. In Figs. 2 and 3 the main part C and projection C' are flush at the under side. In Fig. 4 the part C is sharpened or brought to an edge, *c*.

In Figs. 1, 3, and 4 the part C or calk proper is shown formed of two parts placed end to end with an intervening space, their adjacent ends being joined by or merged into the U-shaped projection C'. It is not necessary that the two parts of the calk C and the projection C' should be formed of separate pieces of metal and united, it being far preferable to form all integrally. I do not, however, desire to limit myself to either mode of construction, for the reason that the result is the same by whatever process the calk may be formed. In Fig. 5 the projection C' is shown solid, and the part C has not a separation at the middle, as shown in the other figures. The form shown in Figs. 1, 2, 3, and 4 has the advantage of lightness.

D is a steady-pin, by which the calk is attached to the heated shoe preparatory to welding it fast. No novelty is claimed in this pin or stud, as it is in common use upon toe-calks.

Having fully described my invention, what I claim is—

1. The combination, with a horseshoe, of a calk formed in two parts with an intervening space and a lateral projection joining the adjacent ends of said parts, substantially as set forth.

2. The combination, with a horseshoe, of a calk having a lateral enlargement or projection from one side thereof, said enlargement being of a width less than the length of the calk proper, and the wearing-surfaces of said calk and enlargement being flush or nearly so, substantially as and for the purposes set forth.

3. The combination, with the horseshoe A, of the calk C, having on the front side thereof a lateral enlargement or projection, the under surfaces of said calk and projection being flush, substantially as and for the purposes set forth.

4. The combination, with the horseshoe A, of the calk C, formed in two parts placed end to end with an intervening space and the lateral projection C', of U shape, joining the adjacent ends of said parts C, as and for the purposes set forth.

JOHN MYERS.

In presence of—
SAML. KNIGHT,
BENJN. A. KNIGHT.